United States Patent [19]

Kracklauer et al.

[11] 4,341,881
[45] Jul. 27, 1982

[54] FLEXIBLE POLYVINYL CHLORIDE PLASTICS HAVING IMPROVED FLAME RETARDANCY AND REDUCED SMOKE GENERATING PROPERTIES

[75] Inventors: John J. Kracklauer, Longmont; Charles J. Sparkes, Boulder, both of Colo.

[73] Assignee: Syntex (U.S.A.) Inc., Palo Alto, Calif.

[21] Appl. No.: 31,673

[22] Filed: Apr. 19, 1979

Related U.S. Application Data

[63] Continuation of Ser. No. 738,495, Nov. 3, 1976, abandoned.

[51] Int. Cl.³ .................................................. C08K 5/56
[52] U.S. Cl. ............................. 524/176; 524/411; 524/412; 524/567; 524/569; 525/201; 252/609
[58] Field of Search .................. 260/45.75 P, 45.75 B; 525/201; 252/609

[56] References Cited

U.S. PATENT DOCUMENTS 3,816,367  6/1974  Larkin et al. ..................... 260/45.7
3,926,881  12/1975  Kracklauer .................... 260/28.5 D

FOREIGN PATENT DOCUMENTS 2307387  8/1973  Fed. Rep. of Germany.
2,459,957  6/1976  Fed. Rep. of Germany.
1498090  1/1978  United Kingdom.

Primary Examiner—V. P. Hoke
Attorney, Agent, or Firm—Tom M. Moran; Joseph I. Hirsch

[57] ABSTRACT

Flexible polyvinyl chloride having improved flame retardancy and reduced smoke generating properties. The plastics are characterized in that they contain about from 0.01 to 0.2 parts, by wt., based on the iron content, of a high molecular weight ferrocene derivative and about 0.1 to 20 parts, by wt., of antimony oxide per 100 parts of polyvinyl chloride resin. A composition comprising the ferrocene derivative and antimony oxide useful for preparing the improved plastic is also disclosed.

9 Claims, No Drawings

FLEXIBLE POLYVINYL CHLORIDE PLASTICS HAVING IMPROVED FLAME RETARDANCY AND REDUCED SMOKE GENERATING PROPERTIES

This is a continuation of application Ser. No. 738,495, filed Nov. 3, 1976 now abandoned.

BACKGROUND OF THE INVENTION

1. Field of the Invention

This invention relates to flexible polyvinyl chloride plastics having improved flame retardancy and improved smoke suppression properties and to methods of preparing such plastics. In a further aspect this invention relates to a mixture of antimony oxide and a ferrocene derivative.

2. The Prior Art

Two of the major safety problems incident to polyvinyl chloride plastic systems, or other plastic systems, are flammability and smoke generation. Accordingly, many additives and combinations of additives have been added and proposed by the prior art in an attempt to reduce one or the other of these safety problems. Note, for example, U.S. Pat. Nos. 2,894,918; 3,513,119; 3,639,302; 3,676,376 and British Pat. No. 1,049,333. A major problem with these prior art solutions is that typically a system or additive which reduces one of these problems, for instance, i.e. flammability or smoke reduction, inherently causes an increase in the other. Thus, for example, the addition of additives such as antimony oxide ($Sb_2O_3$) or tricresyl phosphate to certain plastics produce a dramatic reduction in flammability but cause an increase in the amount of smoke generated by the plastic. Belgium Pat. No. 795,480 discloses that by adding small amounts of ferrocene, or ferrocene derivatives to polyvinyl chloride plastics, that a very substantial reduction in the smoke generating properties of the plastic can be obtained. U.S. Pat. No. 3,926,811 discloses the use of high molecular weight ferrocene derivatives in combination with halogenated paraffins in flexible polyvinyl chloride plastics to improve flame retardancy and reduce smoke generation. A comparison of the % char; oxygen index; and smoke generating properties of a polyvinyl chloride plastic (60% wt. pvc, 40% wt. dioctylphthalate) containing 1% wt. antimony oxide and 0.25% ferrocene with an untreated control sample and samples containing only ferrocene or antimony oxide is shown in Arapahoe Chemicals Data Sheet D2037. The use of ferrocene per se in flexible polyvinyl chloride plastics is impractical since ferrocene diffuses out of the material over prolonged periods of use.

A further difficulty in designing smoke suppressant and/or flame retardant additives for plastics is the empirical nature of the problem, thus until a given additive or combination of additives has actually been used with respect to a given plastic, it is virtually impossible to predict with any certainty what the combined affect on flame retardancy and smoke suppression will be. We have now discovered that by adding small amounts of high molecular weight, ferrocene derivatives and antimony oxide to polyvinyl chloride plastics, and especially flexible polyvinyl chloride plastics, that a substantial increase in smoke reduction and a substantial increase in flame retardancy over the untreated plastic is obtained. This improvement is further generally synergistic with respect to flame retardancy over the summation of the improvement obtained by using the respective additives individually.

SUMMARY OF THE BACKGROUND

In summary, one embodiment of the invention comprises a polyvinyl chloride plastic system containing a ferrocene derivative having a molecular weight of at least 360, and antimony oxide and possessing enhanced flame retardancy and smoke suppression properties.

A further embodiment of the invention comprises a premix composition comprising antimony oxide and a ferrocene derivative having a molecular weight of at least 360.

The invention will be further described herein below.

DETAILED DESCRIPTION OF THE INVENTION AND PREFERRED EMBODIMENTS

Considering the invention in detail, the flexible polyvinyl chloride compositions, of the invention, comprise, per 100 parts, by wt., of polyvinyl chloride resin, about from 0.01 to 0.2 part, by wt., preferably about from 0.02 to 0.1 parts by wt., based on the iron content of a ferrocene derivative having a molecular weight of at least 360, and 0.1 to 20 parts, by wt., preferably about from 1 to 5 parts, by wt., of antimony oxide. The quantity of the ferrocene derivative is critical since if quantities of the ferrocene derivative in excess of the prescribed range are used, the ferrocene derivative will function as an oxidation catalyst; thus increasing the flammability of the plastic. Quantities of the ferrocene derivative below the prescribed range are ineffective. Also, the weight ratio of antimony oxide to ferrocene derivatives (based on iron content) should be in the range of about from 10 to 150, preferably 40 to 60. In each instance the additive is present in the polyvinyl chloride plastic as a physical mixture - i.e. chemically uncombined with the polyvinyl chloride polymer.

Because of the volatility of ferrocene and its lower molecular weight derivatives, we have found that such additives, although quite suitable for use in rigid polyvinyl chloride, are unsuitable for prolonged use in flexible polyvinyl; since over a prolonged period they will diffuse out of the plastic and will be lost to the atmosphere by evaporation. Suitable ferrocene derivatives, which can be used in the invention, are those having a molecular weight of at least 360 and include both simple high molecular weight ferrocene derivatives such as, for example, monoalkyl and dialkyl substituted ferrocenes, for example, butyldecyl ferrocene, hexadecyl ferrocene, bis-(heptylcyclopentadienyl)-iron, monoalkanoyl and dialkanoyl substituted ferrocenes, for example, lauroyl ferrocene, and also dimers and polymers such as, for example, vinyl ferrocene copolymers with vinyl chloride or acrylic acid or methyl methacrylate, or butadiene (see U.S. Pat. No. 3,770,787) or cyclopentane (see U.S. Pat. No. 3,350,369); ferrocene condensation dimers and polymers with aldehydes and ketones; ferrocene addition products with polyvinyl chloride and polyvinylidene chloride; and the like. The high molecular weight ferrocene derivatives are known compounds and can be prepared according to known procedures such as, for example, described in J.A.C.S., 74, 3458 (1952), U.S. Pat. Nos. 3,238,185, 3,341,495, 3,350,369, 3,437,634, 3,673,232, 3,770,787 or by obvious modifications of such procedures. More specifically, U.S. Pat. No. 3,238,185 describes the preparation of ferrocene polymers of the following type

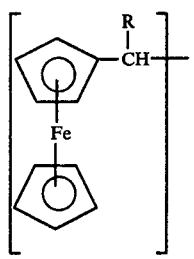

wherein m is an integer of from two up to high values, e.g. 50; R is hydrogen, low molecular weight alkyl groups or aryl or alkylaryl, e.g. phenyl, methylphenyl, ethylphenyl, etc. The cyclopentadienyl rings of the ferrocenyl group may be substituted by alkyl groups, aryl, aralkyl, alkaryl, or halogen. One or more of such groups may be present as substituents on one or both of the cyclopentadienyl rings.

U.S. Pat. No. 3,341,495 describes polymers having a repeating unit of the novolac type as follows

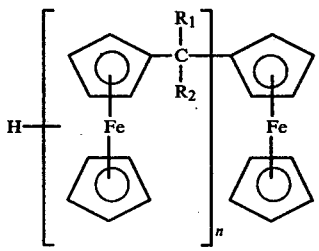

wherein $R_1$ and $R_2$ are independently hydrogen, alkyl, aryl, such as phenyl, or aralkyl such as benzyl phenylethyl, etc. The cyclopentadienyl rings may be substituted, e.g. by low molecular weight alkyl groups (e.g. methyl, ethyl, etc.) or aryl groups (e.g. phenyl) or aralkyl groups (e.g. benzyl and phenylethyl); also by halogens, nitro or amino groups.

U.S. Pat. No. 3,673,232 discloses dimeric dicyclopentadienyl iron polymers of the formula

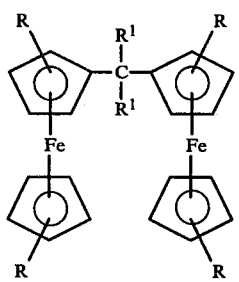

wherein each R independently is hydrogen, halo, alkyl, cycloalkyl, aryl, or heterocyclic and each $R^1$ independently is alkyl, aryl or aralkyl.

U.S. Pat. No. 3,437,634 discloses polymers having the formulas

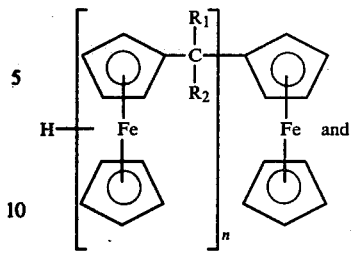

wherein n is a positive integer, $R_1$ and $R_2$ are independently hydrogen, alkyl, aryl or arylalkyl; R' is an organic radical selected from the group consisting of aliphatic, cycloaliphatic, aromatic and heterocyclic radicals, said radical comprising a reactive group selected from the class consisting of carboxyl, hydroxyl, cyano, alkoxy, amino, halogen, and olefinically unsaturated groups; R" is a member selected from the group consisting of hydrogen and an organic radical selected from the group consisting of aliphatic, cycloaliphatic, aromatic and heterocyclic groups; and wherein the cyclopentadienyl moieties can be substituted with low molecular weight alkyls, aryls, aralkyls, halogen, nitro or amino groups.

We have further found that particularly good results are obtained by using 2,2-diferrocenyl-propane polymers; especially those of the class which can be obtained by the reaction of 2-ferrocenyl-2-propene with formic acid described by Horspool et al, in the *Canadian Journal of Chemistry*, Vol. 48, page 3542, 3544 (1970).

The premix composition of the invention comprises the ferrocene derivative, or mixtures thereof, set forth herein above and antimony oxide in the ratios set forth herein above with respect to the polyvinyl chloride plastic. Optionally the premix composition can also contain a suitable volatile organic solvent, for the ferrocene derivative, to facilitate handling and blending of the premix. The solvent can be easily removed by evaporation after the premix is mixed with polyvinyl chloride plastic. Suitable solvents include, for example, methylene dichloride, toluene, xylene, and the like and compatible mixtures thereof. The premix has the advantage that it can be easily shipped and stored by the polyvinyl chloride manufacturer or compounder and then added to the raw polyvinyl chloride plastic as needed.

The polyvinyl chloride plastics of the invention can be prepared by adding the ferrocene derivative and antimony oxide in the prescribed ratios to the polyvinyl chloride polymers either individually or as a mixture or the premix of the invention. Conveniently, in the case of ferrocene derivatives having a high viscosity, the derivative is first mixed with a volatile solvent (e.g. methylene dichloride, toluene, xylene, etc.) to facilitate mixing and blending. After blending with the polyvinyl chloride polymer has been completed, the solvent can then be easily removed by evaporation. Although preferably these additives are blended after polymerization, the additives can also be added either individually or as a blend directly to the polyvinyl chloride monomers prior to polymerization.

The flame retardant, low smoke, flexible polyvinyl chloride compositions of the invention otherwise have essentially the same properties as the corresponding untreated flexible polyvinyl chloride and hence can be used for the same kind of products, e.g. automobile and airplane parts, containers, appliances, electrical devices, furniture, etc., and are particularly desirable in applications where the risk of fire or smoke toxicity is particularly prevalent; such as, for example, in buildings, mass-transit vehicle parts, furniture, and electrical insulation (coatings) and devices.

DEFINITIONS

As used herein above and below, the following terms have the following meanings unless expressly stated to the contrary.

The term ferrocene derivative refers to organic compounds containing a ferrocenyl radical or ferrocene nucleus.

The term plastic refers to a material that contains, as an essential ingredient, an organic substance of large molecular weight; is solid in its finished state; and at some stage in its manufacture processing as finished articles, can be shaped by flow (definition from *ASTM, D-883-541*). The term plastic and resin (q.v.) are used in overlapping senses but resin applies more specifically to the more or less chemically homogeneous polymer used as starting materials in the production molded articles while plastic signifies the final solid product, which may contain fillers, plasticizers, stabilizers, pigments, or other additives. Note, *Condensed Chemical Dictionary*, Seventh Edition, Reinhold Publishing Corporation, pages 751-2.

The term polyvinyl chloride plastics, or polyvinyl chloride resins, refers to such plastics or resins containing a vinyl chloride homopolymer or copolymers containing a minimum of about 50% vinyl chloride polymerized in accordance with known methods, e.g. anionic, cationic, free radical, singularly induced, and the like.

The term flexible polyvinyl chloride refers to polyvinyl chloride plastics or resins containing at least 10 parts per wt. of one or more plasticizers per 100 parts of the polyvinyl chloride polymer; typically about from 30 to 80 pph. Typical plasticizers include, for example, dioctyl phthalate, tricresylphosphate, diisodecyl phthalate, and the like.

The term "ppw", "parts" or "pts." refers to parts by weight. The term "pph" means parts per hundred parts.

The dicyclopentadienyl iron polymers have their polymer linkages via (between) the cyclopentadienyl moieties.

The prescribed quantities and ratios of ferrocene have been expressed in terms of iron content since this is directly correctable molecularly with the ferrocene content of the ferrocene derivative (i.e. one mole of ferrocene or ferrocenyl radical contains one mole of iron) and as the standard analysis for ferrocene is routinely conducted by analyzing for iron and then correlating this to ferrocenyl.

A further understanding of the invention can be had from the following non-limiting examples.

EXAMPLE 1

This example illustrates the improved flame retardancy and reduced smoke generating properties of the flexible polyvinyl chloride plastic compositions of the invention. In this example, test compositions are prepared containing varying quantities of antimony oxide and ferrocenyl polymer (containing about 23.6% wt. iron) of the class obtained by the reaction of 2-ferrocenyl-2-propene with formic acid described by Horspool et al, *Can. J. Chem.*, Vol. 48, page 3542, 3544 (1970). Samples are also prepared for both the untreated flexible polyvinyl chloride plastic and also flexible polyvinyl chloride plastics containing only varying quantities of either antimony oxide or the ferrocenyl polymer. The untreated control formulation and the base flexible polyvinyl chloride plastic formulation used for each sample contains 100 parts polyvinyl chloride resin; 50 parts diisodecyl phthalate (plasticizer); and 1 part of a tin-mercaptan thermal stabilizer (sold under the trademark TM 181 by Cincinnati Millacron Corporation). Hence, with the exception of the antimony oxide and/or ferrocene derivative content, the samples are all otherwise identical.

The sample are prepared by pre-blending all of the components of the sample except the polyvinyl resin and then adding the pre-blend to the polyvinyl resin powder. The resulting mixture is then stirred and poured into a compression mold and then contact compression molded for about two minutes at 175° C. The respective compositions are identically tested for flammability in accordance with the procedure described by ASTM D2863 for Oxygen Index (note: higher Oxygen Index number indicates improved flame retardancy). The compositions are identically tested for % smoke and % char using an Arapahoe smoke chamber consisting of a cylindrical combustion chamber 5" in diameter mounted vertically with an ignition orifice at its lower edge measuring 2.5" wide and 2.25" high. The sample ($1\frac{1}{2}"\times\frac{1}{2}"\times\frac{1}{8}"$ in size) is supported horizontally $1\frac{3}{4}"$ from the bottom. The flame source is a micro-Bunsen burner fired with 60 cc. per minute of propane (1.67 BTU per min. heat flux). It is positioned so that the tip of the inner blue cone impinges the lower edge of the sample at a 210° angle. The combustion chamber is fitted with a 3" diameter by 24" high chimney to cool the combustion gases. These gases and entrained smoke then impinge on a filter paper which covers the orifice of a high-capacity vacuum source. The velocity at the ignition orifice is 180 ft./min., in the chamber it is 50 ft./min., and in the chimney it is 145 ft./min. This is sufficient to entrain all the smoke produced during combustion and provides efficient collection on the filter paper.

Procedure

The flame exposure for all tests is 30 seconds with the vacuum source turned on five seconds before the flame exposure and turned off 30 seconds after the flame is removed (and sample extinguished if necessary).

Data Reduction

The sample is weighed before and after flame exposure and the loss of volatile products recorded.

The filter paper is weighed before and after and smoke weight recorded.

The sample then is mechanically debrided of char, using a sand mill (inclined 45° from the horizontal and rotating at 60 rpm) and reweighed.

The amount involved in combustion is the net difference between the initial sample weight and final weight after char removal. Char weight is the difference between intermediate and final sample weight.

Smoke weight and char weight are then reduced to percentages by division by the amount involved in combustion ×100.

In accordance with this test, a lower smoke % index and a high char % index are desirable. The results of these tests are summarized in Table 1 (control formulations) and Table 2 (test formulations of the Invention).

TABLE 1
CONTROL FORMULATIONS

| FORMULATION NUMBER | 1 | 2 | 3 | 4 | 5 | 6 |
|---|---|---|---|---|---|---|
| Ferrocene derivative, ppw (based on iron content) | 0 | 0.025 | 0.050 | 0 | 0 | 0 |
| Antimony Oxide pbw | 0 | 0 | 0 | 1.0 | 3.0 | 5.0 |
| % smoke | 12.3 | 8.7 | 8.0 | 13.5 | 14.0 | 12.6 |
| % char | 6.6 | 9.3 | 10.8 | 6.6 | 5.6 | 5.2 |
| Oxygen Index | 23.9 | 26.6 | 26.2 | 25.9 | 27.3 | 29.4 |

TABLE 2
TEST FORMATIONS

| FORMULATION NUMBER | 7 | 8 | 9 | 10 | 11 | 12 |
|---|---|---|---|---|---|---|
| Ferrocene derivative, ppw (based on iron content) | 0.025 | 0.025 | 0.0375 | 0.05 | 0.05 | 0.0675 |
| Antimony Oxide pbw | 1.0 | 3.0 | 2.0 | 1.0 | 3.0 | 5.0 |
| Ratio Antimony Oxide/Iron | 40 | 120 | 53.3 | 20 | 60 | 74.1 |
| % smoke | 9.8 | 10.1 | 9.3 | 8.7 | 9.4 | 9.6 |
| % char | 9.1 | 9.8 | 11.1 | 12.1 | 11.2 | 12.5 |
| Oxygen Index | 28.1 | 30.4 | 30.0 | 28.6 | 30.6 | 31.6 |

Tables 3 and 4 summarize the improvement over the untreated control formulation which is obtained by the formulations of Tables 1 and 2, respectively.

TABLE 3

Improvement over untreated formulation of formulation containing only one of antimony oxide or the ferrocene derivative.

| FORMULATION NUMBER | 1 | 2 | 3 | 4 | 5 | 6 |
|---|---|---|---|---|---|---|
| Ferrocene derivative, ppw (based on iron content) | 0 | 0.025 | 0.050 | 0 | 0 | 0 |
| Antimony Oxide pbw | 0 | 0 | 0 | 1.0 | 3.0 | 5.0 |
| Improvement | | | | | | |
| Δ % smoke reduction | 0 | 3.6 | 4.3 | −1.2 | −1.7 | −0.3 |
| Δ % char increase | 0 | 2.7 | 4.2 | 0 | −1.0 | −1.4 |
| Δ Oxygen Index increase | 0 | 2.7 | 2.3 | 2.0 | 3.4 | 5.5 |

TABLE 4

Improvement over untreated formulation of formulations containing both antimony oxide and the ferrocene derivative.

| FORMULATION NUMBER | 7 | 8 | 9 | 10 | 11 | 12 |
|---|---|---|---|---|---|---|
| Ferrocene derivative, ppw (based on iron content) | 0.025 | 0.025 | 0.0375 | 0.05 | 0.05 | 0.067 |
| Antimony Oxide pbw | 1.0 | 3.0 | 2.0 | 1.0 | 3.0 | 5.0 |
| Improvement | | | | | | |
| Δ % smoke reduction | 2.5 | 2.2 | 3.0 | 3.6 | 2.9 | 2.7 |
| Δ % char increase | 2.5 | 3.2 | 4.5 | 5.5 | 4.6 | 5.9 |
| Δ Oxygen Index increase | 4.2 | 6.5 | 6.1 | 4.7 | 6.7 | 7.7 |

EXAMPLE 2

The following Table 5 summarizes the improvement over the control which would be predicted for the ferrocene derivative and antimony oxide combination by summing the improvements obtained by the respective single compound system.

An overview of improvement or synergistic effect of the invention over the predicted values is shown in Table 6, herein below.

TABLE 5
PREDICTED VALUES

| FORMULATION NUMBER | 7 | 8 | 9 | 10 | 11 | 12 |
|---|---|---|---|---|---|---|
| Ferrocene derivative, ppw (based on iron content) | 0.025 | 0.025 | 0.0375* | 0.05 | 0.05 | 0.0675* |
| Antimony Oxide pbw | 1.0 | 3.0 | 2.0* | 1.0 | 3.0 | 5.0 |
| Predicted Improvement | | | | | | |
| Δ % smoke | 2.4 | 1.9 | 1.4 | 3.1 | 2.6 | 4.2 |
| Δ % char | 2.7 | 1.7 | 2.9 | 4.2 | 3.2 | 3.5 |
| Δ Oxygen Index | 4.7 | 6.1 | 5.2 | 4.3 | 5.7 | 7.6 |

(*In cases where an actual test was not conducted for a single component system corresponding to the concentration of that component in the combination system, the improvement value is obtained by interpolating or extrapolating a plot of the actual test values for the variable [i.e. smoke, char or Oxygen Index] versus additive concentration for the value in question and subtracting the control value from the value to obtain the improvement.)

TABLE 6
IMPROVEMENT OF ACTUAL OVER PREDICTED IMPROVEMENT[1]

| FORMULATION NUMBER | 7 | 8 | 9 | 10 | 11 | 12 |
|---|---|---|---|---|---|---|
| Ferrocene derivative, ppw (based on iron content) | 0.025 | 0.025 | 0.0375 | 0.05 | 0.05 | 0.0675 |
| Antimony Oxide pbw | 1.0 | 3.0 | 2.0 | 1.0 | 3.0 | 5.0 |
| Ratio Antimony Oxide/Iron | | | | | | |
| Improvement over Predicted Values | | | | | | |
| Δ % smoke* | 0.1 | 0.3 | 1.6 | 0.5 | 0.3 | −1.5 |
| % Improvement** | 4.2 | 15.8 | 12.3 | 16.1 | 11.4 | −35.7 |
| Δ % char* | −0.2 | 1.5 | 1.6 | 1.3 | 1.4 | 1.7 |
| % Improvement** | −7.4 | 88.2 | 55 | 31 | 43.8 | 40.5 |
| Δ % Oxygen Index* | −0.5 | 0.4 | 0.9 | .4 | 1.0 | 0.1 |
| % Im- | | | | | | |

TABLE 6-continued

IMPROVEMENT OF ACTUAL OVER PREDICTED IMPROVEMENT[1]

| FORMULATION NUMBER | 7 | 8 | 9 | 10 | 11 | 12 |
|---|---|---|---|---|---|---|
| provement** | −10.6 | 6.6 | 17.3 | 9.3 | 17.5 | 1.3 |

*Δ Improvement Actual - Δ Improvement Predicted
**(Δ Improvement Actual - Δ Improvement Predicted/Δ Improvement Predicted) × 100.
[1]Because of the relatively small increments involved as compared with the total variable measured, the experimental error factor becomes very significant. Hence the results in this table should be construed in toto as reflecting an overview and not individually.

EXAMPLE 3

This example further illustrates the improved flame retardancy of the compositions of the invention. In this example test compositions are again prepared containing varying quantities of antimony oxide and ferrocenyl polymer but generally using greater amounts of antimony oxide than used in Example 1. The ferrocenyl polymer used is again of the same class as described by the Horspool et al reference, previously cited and contains about 23.6% iron by weight. Control samples are again prepared for both the untreated flexible polyvinyl chloride plastic and also flexible polyvinyl chloride plastic samples containing only varying quantities of one additive. The untreated control formulation and the base flexible polyvinyl chloride plastic formulation used for each sample contains 100 parts polyvinyl chloride resin; 100 parts diisodecyl phthalate (plasticizer); and 1 part of a tin-mercaptan thermal stabilizer (sold under the trademark TM 181 by Cincinnati Millacron Corporation). Hence, with the exception of the antimony oxide and/or ferrocene derivative content, the samples are all otherwise identical.

The samples are prepared by pre-blending all of the components of the sample except the polyvinyl resin and then adding the pre-blend to the polyvinyl resin powder. The resulting mixture is then stirred and poured into a compression mold and then contact compression molded for about two minutes at 175° C. The respective compositions are identically tested for flammability in accordance with the procedure described by ASTM D2863 for Oxygen Index (note: a higher Oxygen Index number indicates improved flame retardancy). The compositions are identically tested for smoke; char; and Oxygen Index by the same procedure as described in Example 1 hereinabove.

The results of these tests are summarized in the following Tables A and B (control formulations) and Table C (test formulations of the invention).

TABLE A

| CONTROL FORMULATIONS | | | | |
|---|---|---|---|---|
| FORMULATION NUMBER | Control | 13 | 14 | 15 |
| Ferrocene derivative, ppw (based on iron content) | 0 | 0 | 0 | 0 |
| Antimony Oxide pbw | 0 | 7.5 | 10 | 20 |
| Ratio Antimony Oxide/Iron | — | — | — | — |
| % smoke | 13.4 | 15.3 | 15.5 | 14.4 |
| % char | 3.7 | 2.8 | 3.3 | 3.9 |
| Oxygen Index | 22.2 | 24.9 | 25.4 | 26.4 |

TABLE B

| CONTROL FORMULATIONS | | | | |
|---|---|---|---|---|
| FORMULATION NUMBER | Control | 16 | 17 | 18 |
| Ferrocene derivative, ppw (based on iron content) | 0 | 0.05 | 0.1 | 0.15 |
| Antimony Oxide pbw | 0 | 0 | 0 | 0 |
| Ratio Antimony Oxide/Iron | — | — | — | — |
| % smoke | 13.4 | 10.7 | 10.3 | 10.1 |
| % char | 3.7 | 7.9 | 9.1 | 9.1 |
| Oxygen Index | 22.2 | 21.5 | 20.9 | 21.1 |

TEST C

| TEST FORMULATIONS | | | | | |
|---|---|---|---|---|---|
| FORMULATION NUMBER | Control | 19 | 20 | 21 | 22 |
| Ferrocene derivative, ppw (based on iron content) | 0 | 0.05 | 0.1 | 0.15 | 0.1 |
| Antimony Oxide pbw | 0 | 7.5 | 10 | 20 | 5 |
| Ratio Antimony Oxide/Iron | — | 150 | 100 | 133 | 50 |
| % smoke | 13.4 | 12.4 | 12.2 | 11.9 | 12.2 |
| % char | 3.7 | 7.8 | 9.1 | 10.3 | 8.5 |
| Oxygen Index | 22.2 | 25.0 | 26.1 | 26.7 | 24.5 |

As can be seen from the above table, in each instance the test sample has substantially improved flame resistance, char and smoke generating properties as compared with the untreated control sample and an improved combination of these properties as compared with the samples containing only antimony oxide or only the ferrocene derivative.

EXAMPLE 4

The following Table D summarizes the predicted flame retardancy, smoke, and percent char obtained by adding the summation of the respective improvements (or different) obtained by the respective samples containing only antimony oxide or the ferocene derivative over the untreated sample, to the values obtained for the untreated sample. As can be seen by comparing the respective oxygen indices in Tables C and D, in each instance the flame retardancy is significantly better for the formulations of the invention than would be obtained by the summarization of the effect obtaining by samples containing only the ferrocene derivative or antimony oxide.

TABLE D

| PREDICTED VALUES | | | | |
|---|---|---|---|---|
| FORMULATION NUMBER | Control | 19p | 20p | 21p |
| Ferrocene derivative, ppw (based on iron content) | 0 | 0.05 | 0.1 | 0.15 |
| Antimony Oxide pbw | 0 | 7.5 | 10 | 20 |
| Ratio Antimony Oxide/Iron | — | 150 | 100 | 133 |
| % smoke | 13.4 | 12.6 | 12.4 | 11.1 |
| % char | 3.7 | 7 | 8.7 | 9.3 |
| Oxygen Index | 22.2 | 24.2 | 24.1 | 25.3 |

Obviously many modifications and variations of the invention, described herein above and below in the claims, can be made without departing from the essence and scope thereof.

What is claimed is:

1. A flexible polyvinyl chloride plastic having improved flame retardancy and smoke suppression properties, containing in chemically uncombined form, per 100 parts, by wt., of polyvinyl chloride resin, a flame-retarding, smoke-suppressing mixture consisting essentially of from about 1 to about 20 parts, by weight, of antimony oxide and from about 0.01 to about 0.2 parts, by wt., based on iron content, of an organic compound containing a ferrocenyl radical of ferrocene nucleus, said organic compound having a molecular weight of a least 360, wherein the weight ratio of said antimony oxide to said organic compound (based on iron content) is in the range of about from 10 to 150 and wherein said organic compound is selected from the group consisting of monoalkyl and dialkyl substituted dicyclopentadienyl iron derivatives, alkanoyl substituted dicyclopentadienyl iron derivatives, and dimers and polymers of dicyclopentadienyl iron selected from the group of condensation products of dicyclopentadienyl iron, or alkyl derivatives thereof, with an aldehyde or ketone, copolymers of vinyl ferrocene with vinyl chloride, acrylic acid, methyl methacrylate, butadiene or cyclopentane and dicyclopentadienyl iron addition products with polyvinyl chloride or polyvinylidene chloride; and mixtures thereof.

2. The composition of claim 1 wherein said weight ratio is in the range of about from 40 to 60.

3. The composition of claim 1 wherein said plastic contains about from 1 to 5 parts, by wt., of said antimony oxide.

4. The composition of claim 1 wherein said organic compound is selected from the group consisting of the condensation polymers of ferrocene with acetone and mixtures thereof.

5. The composition of claim 1 wherein said organic compound is a ferrocenyl polymer of the general class obtained by the reaction of formic acid and 2-ferrocenyl-2-propene.

6. A flexible polyvinyl chloride plastic having improved flame retardancy and smoke suppression properties, containing in chemically uncombined form, per 100 parts, by wt., of polyvinyl chloride resin, about from 0.1 to 20 parts, by wt., of antimony oxide and about from 0.01 to 0.2 part, by wt., based on the iron content, of an organic compound containing a ferrocenyl radical or ferrocene nucleus, said organic compound having a molecular weight of at least 360, selected from the group consisting of monoalkyl and dialkyl substituted dicyclopentadienyl iron, monoalkanoyl and dialkanoyl substituted dicyclopentadienyl iron, and polymers of dicyclopentadienyl iron selected from the group consisting of copolymers of vinyl ferrocene with vinyl chloride, acrylic acid, methyl methacrylate, butadiene or cyclopentane; and dicyclopentadienyl iron condensation polymers having the formula

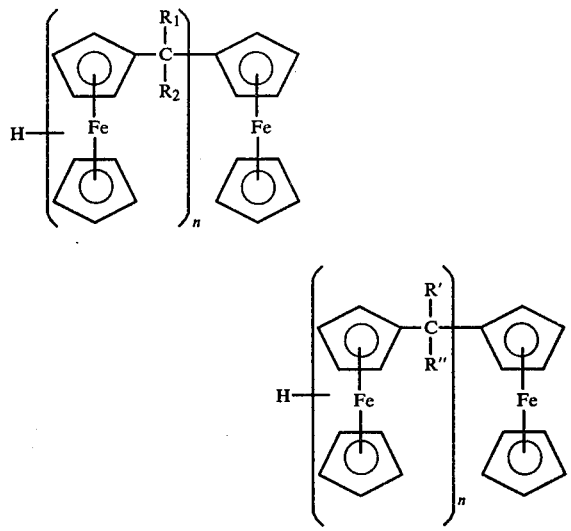

wherein n is a positive integer, $R_1$ and $R_2$ are independently hydrogen, alkyl, aryl, or arylalkyl; R' is an organic radical selected from the group consisting of aliphatic, cycloaliphatic, aromatic and heterocyclic radicals, said radical comprising a reactive group selected from the class consisting of carboxyl, hydroxyl, cyano, alkoxy, amino, halogen, and olefinically unsaturated groups; R" is a member selected from the group consisting of hydrogen and an organic radical selected from the group consisting of aliphatic, cycloaliphatic, aromatic and heterocyclic groups; and wherein the cyclopentadienyl moieties can be substituted with low molecular weight alkyls, aryls, aralkyls, halogen, nitro or amino groups;
and mixtures of such organic compounds.

7. The composition of claim 6 wherein said condensation polymer is selected from the group of the condensation polymers of ferrocene with acetone and mixtures thereof.

8. A plastics additive composition, for improving the flame retardancy and reducing the smoke generating properties of plastics, consisting essentially of antimony oxide and an organic compound containing a ferrocenyl radical or ferrocene nucleus, said organic compound having a molecular weight of at least 360, wherein the weight ratio of said antimony oxide to said organic compound (based on the iron content thereof) is in the range of about from 10 to 150 parts of antimony oxide per one part of chemically combined iron contained in said organic compound and wherein said organic compound is selected from the group consisting of monoalkyl and dialkyl substituted dicylopentadienyl iron derivatives, alkanoyl substituted dicyclopentadienyl iron derivatives, and dimers and polymers and dicyclopentadienyl iron selected from the group of condensation products of dicyclopentadienyl iron, or alkyl derivatives thereof, with an aldehyde or ketone, copolymers of vinyl ferrocene with vinyl chloride, acrylic acid, methyl methacrylate, butadiene or cyclopentane and dicyclopentadienyl iron addition products with polyvinyl chloride or polyvinylidene chloride; and mixtures thereof.

9. The composition of claim 8 wherein said weight ratio is in the range of about from 40 to 60 parts of antimony oxide per part of chemically combined iron contained in said organic compound.

* * * * *